United States Patent
Yang et al.

(10) Patent No.: US 12,401,604 B2
(45) Date of Patent: Aug. 26, 2025

(54) WIRELESS MESH NETWORK

(71) Applicant: Nokia Solutions and Networks Oy, Espoo (FI)

(72) Inventors: Zhijie Yang, Shanghai (CN); Haiqin Wu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 314 days.

(21) Appl. No.: 17/999,098

(22) PCT Filed: Jul. 2, 2020

(86) PCT No.: PCT/CN2020/099951
§ 371 (c)(1),
(2) Date: Nov. 17, 2022

(87) PCT Pub. No.: WO2022/000427
PCT Pub. Date: Jan. 6, 2022

(65) Prior Publication Data
US 2023/0336496 A1  Oct. 19, 2023

(51) Int. Cl.
*H04L 47/62* (2022.01)
*H04W 28/02* (2009.01)

(52) U.S. Cl.
CPC ......... *H04L 47/621* (2013.01); *H04W 28/021* (2013.01)

(58) Field of Classification Search
None
See application file for complete search history.

(56) References Cited

U.S. PATENT DOCUMENTS

| 8,248,949 B2 | 8/2012 | Ozer et al. |
| 8,705,388 B2 | 4/2014 | Gong et al. |

(Continued)

FOREIGN PATENT DOCUMENTS

| CN | 1805586 A | 7/2006 |
| CN | 101772068 A | 7/2010 |

(Continued)

OTHER PUBLICATIONS

International Preliminary Report on Patentability received for corresponding Patent Cooperation Treaty Application No. PCT/CN2020/099951, dated Jul. 28, 2022, 6 pages.

(Continued)

*Primary Examiner* — Eunsook Choi
(74) *Attorney, Agent, or Firm* — Nokia Technologies Oy

(57) ABSTRACT

Example embodiments of the present disclosure relate to devices, methods, apparatuses and computer readable storage media of dual-channel backhaul in mesh network. The method comprises: generating, at a first device, a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link. By such a dual-channel backhaul architecture, the channel resources on the two channels can be fully utilized for backhaul. With the distribution strategy and the numbering scheme, the solution proposed in the present (Continued)

disclosure bypasses part of the data packets from one backhaul link to another one before the air interface resources on the one backhaul link is run out, without discarding the backhaul data. As such, the throughput of the entire mesh network can be significantly improved and the system is more stable.

16 Claims, 8 Drawing Sheets

(56) References Cited

U.S. PATENT DOCUMENTS

| | | | |
|---|---|---|---|
| 9,560,658 B2 | 1/2017 | Brokvist et al. | |
| 9,967,884 B2 | 5/2018 | Emmanuel et al. | |
| 2006/0083186 A1 | 4/2006 | Handforth et al. | |
| 2008/0192692 A1* | 8/2008 | Chari | H04L 47/50 |
| | | | 370/331 |
| 2015/0055506 A1 | 2/2015 | Birlik et al. | |
| 2015/0138977 A1* | 5/2015 | Dacosta | H04W 28/0268 |
| | | | 370/235 |
| 2015/0373615 A1 | 12/2015 | Hampel | |
| 2016/0277957 A1* | 9/2016 | Patel | H04W 76/16 |
| 2016/0337254 A1* | 11/2016 | Karaki | H04L 47/34 |
| 2017/0034843 A1* | 2/2017 | Liu | H04W 72/542 |
| 2020/0084688 A1 | 3/2020 | Mildh et al. | |
| 2021/0076269 A1* | 3/2021 | Awoniyi-Oteri | H04W 36/083 |
| 2021/0345321 A1* | 11/2021 | Wu | H04W 16/10 |
| 2021/0368360 A1* | 11/2021 | Akl | H04W 92/20 |

FOREIGN PATENT DOCUMENTS

| | | |
|---|---|---|
| CN | 102088313 A | 6/2011 |
| CN | 104350806 A | 2/2015 |
| CN | 106686608 A | 5/2017 |
| CN | 107683625 A | 2/2018 |
| CN | 108306751 A | 7/2018 |
| CN | 109803325 A | 5/2019 |
| CN | 111132197 A | 5/2020 |

OTHER PUBLICATIONS

International Search Report and Written Opinion received for corresponding Patent Cooperation Treaty Application No. PCT/CN2020/099951, dated Mar. 30, 2021, 9 pages.
Dacosta, "First, Second and Third Generation Mesh Architectures", Mesh Dynamics, 2005, pp. 1-6.
"Solving the Wireless Mesh Multi-Hop Dilemma", Strix Systems, Inc, 2005, pp. 1-14.
Szott et al., "Emerging Technologies in Wireless LANs: Theory, Design, and Deployment", IEEE Communications Magazine, vol. 47, No. 4, Apr. 2009, pp. 18-18.
IEEE Computer Society, "Part 11: Wireless LAN Medium Access Control (MAC) and Physical Layer (PHY) Specifications, Amendment 4: Enhancements for Very High Throughput for Operation in Bands below 6 GHz", IEEE Std 802.11ac™-2013.
Office action received for corresponding Chinese Patent Application No. 202080102684.X, dated Sep. 27, 2024, 11 pages of office action and 7 pages of office action translation available.
Extended European Search Report received for corresponding European Patent Application No. 20942638.6, dated Apr. 4, 2023, 9 pages.
Office action received for corresponding Chinese Patent Application No. 202080102684.X, dated Mar. 18, 2025, 10 pages of office action and 8 pages of office action translation available.

* cited by examiner

```
∨ IEEE 802.11 QoS Data, Flags: .p....FTC
     Type/Subtype: QoS Data (0x0028)
  >  Frame Control Field: 0x8843
     .000 0000 0011 0000 = Duration: 48 microseconds
     Receiver address: 62:68:65:13:e0:1c (62:68:65:13:e0:1c)
     Transmitter address: 72:10:10:10:ca:cc (72:10:10:10:ca:cc)
     Destination address: HewlettP_17:94:5d (f4:30:b9:17:94:5d)
     Source address: HewlettP_b7:de:06 (b0:5a:da:b7:de:06)
     .... .... .... 0000 = Fragment number: 0
     0001 0001 1010 .... = Sequence number: 282
     Frame check sequence: 0x00bacd2e [correct]
     [FCS Status: Good]
  ∨ QoS Control: 0x0000
     .... .... .... 0000 = TID: 0
     [.... .... .... .000 = Priority: Best Effort (Best Effort) (0)]
     .... .... ...0 .... = EOSP: Service period
     .... .... .00. .... = Ack Policy: Normal Ack (0x0)
     .... .... 0... .... = Payload Type: MSDU
     ┌─────────────────────────────────────────────────────────┐
     │ ∨ 0000 0000 .... .... = QAP PS Buffer State: 0x00       │
     │   .... ..0. .... .... = Buffer State Indicated: No      │
     └─────────────────────────────────────────────────────────┘
```

FIG. 7

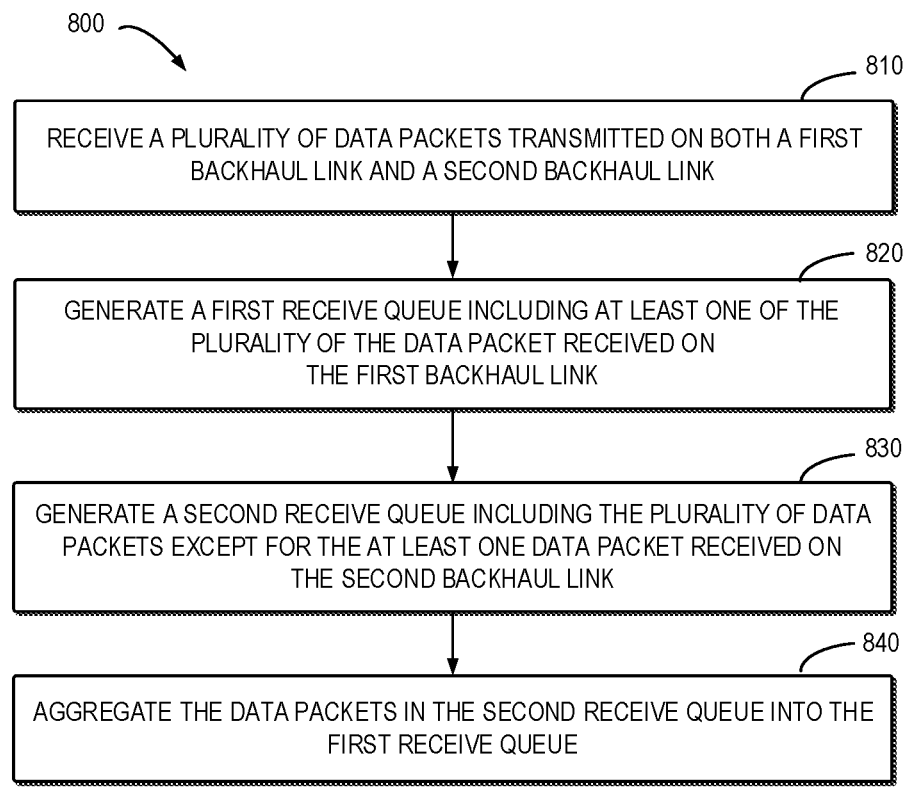

WIRELESS MESH NETWORK

RELATED APPLICATION

This application claims priority to PCT Application No PCT/CN2020/099951, filed on Jul. 2, 2020, which is incorporated herein by reference in its entirety.

FIELD

Embodiments of the present disclosure generally relate to the field of wireless mesh network, and in particular, to devices, methods, apparatus and computer readable storage media of dual-channel backhaul in mesh network.

BACKGROUND

The mesh network is a dynamic network structure that contains multiple access point (AP) nodes and can be continuously expanded. Some of the AP nodes include a 2.4 G Wi-Fi chipset and a 5G one, and thus is capable of working at 2.4 GHz and 5 GHz bands, such as a dual band router, repeater and the like. In this case, the wireless distribution system (WDS) link of the mesh network can be established on both 2.4G and 5G chipsets simultaneously. In order to avoid network loopback issues, the mesh network only allows every two AP nodes to activate one of the WDS links for transmitting data packets at a time. This WDS link is also referred to as the backhaul (BH) link. The other WDS Link is in standby status.

The connection between the terminal device and the AP nodes is referred to as the fronthaul (FH) link. Since the BH link and FH link of the same AP node share the same Wi-Fi chip and operate on the same channel, they utilize air interface resources in time division multiplexing manner. In addition, the AP nodes in the mesh network may compete for air interface resources with each other. In a case of insufficient air interface resources, the buffer of the AP might be full before the backhaul data packets in the buffer have not been transmitted. As a result, the data packets that have not been transmitted may be discarded by the AP. Therefore, the performance of the entire mesh network, such as the throughput of the mesh network may be severely reduced.

SUMMARY

In general, example embodiments of the present disclosure provide a solution of the dual-channel backhaul.

In a first aspect, there is provided a first device. The first device comprises at least one processor; and at least one memory including computer program codes; the at least one memory and the computer program codes are configured to, with the at least one processor, cause the first device to: generate a first transmit queue comprising a plurality of data packets to be transmitted to a second device on a first backhaul link; in accordance with a determination that a distribution strategy is met, select at least one data packet from the plurality of data packets; generate a second transmit queue comprising the at least one data packet, the second transmit queue to be transmitted to the second device on a second backhaul link different from the first backhaul link; and transmit, to the second device, the plurality of data packets except for the at least one data packet on the first backhaul link and the at least one data packet on the second backhaul link.

In a second aspect, there is provided a second device. The second device comprises at least one processor; and at least one memory including computer program codes; the at least one memory and the computer program codes are configured to, with the at least one processor, cause the second device to: receive a plurality of data packets transmitted, by a first device, on both a first backhaul link and a second backhaul link, the first backhaul link being established at a first radio frequency, the second backhaul link being established at a second radio frequency different from the first radio frequency; generate a first receive queue including at least one of the plurality of the data packet received on the first backhaul link; generate a second receive queue including the plurality of data packets except for the at least one data packet received on the second backhaul link; and aggregate the data packets in the second receive queue into the first receive queue.

In a third aspect, there is provided a method. The method comprises: generating, at a first device, a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

In a fourth aspect, there is provided a method. The method comprises: receiving, at a second device, a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

In a fifth aspect, there is provided an apparatus comprising means for generating a first transmit queue comprising a plurality of data packets to be transmitted to a second device on a first backhaul link; means for in accordance with a determination that a distribution strategy is met, distributing at least one data packet from the plurality of data packets; means for generating a second transmit queue comprising the at least one data packet, the second transmit queue to be transmitted to the second device on a second backhaul link different from the first backhaul link; and means for transmitting, to the second device, the plurality of data packets except for the at least one data packet on the first backhaul link and the at least one data packet on the second backhaul link.

In a sixth aspect, there is provided an apparatus comprising: means for receiving a plurality of data packets transmitted, by a first device, on both a first backhaul link and a second backhaul link, the first backhaul link being established at a first radio frequency, the second backhaul link being established at a second radio frequency different from the first radio frequency; means for generating a first receive queue including at least one of the plurality of the data packet received on the first backhaul link; means for generating a second receive queue including the plurality of data packets except for the at least one data packet received on the second backhaul link; and means for aggregating the data packets in the second receive queue into the first receive queue.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

In a ninth aspect, there is provided a computer program comprising instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

In a tenth aspect, there is provided a computer program comprising instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

In a eleventh aspect, there is provided a computer readable medium comprising program instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

In a twelfth aspect, there is provided a computer readable medium comprising program instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

In a thirteenth aspect, there is provided a non-transitory computer readable medium comprising program instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

In a fourteenth aspect, there is provided a non-transitory computer readable medium comprising program instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where

FIG. 7 shows a schematic diagram of data numbering field in MAC header of the data according to some example embodiments of the present disclosure;

FIG. 8 shows a flowchart of an example method of dual channel backhaul according to some example embodiments of the present disclosure;

Throughout the drawings, the same or similar reference numerals represent the same or similar element.

DETAILED DESCRIPTION

Figure 1:
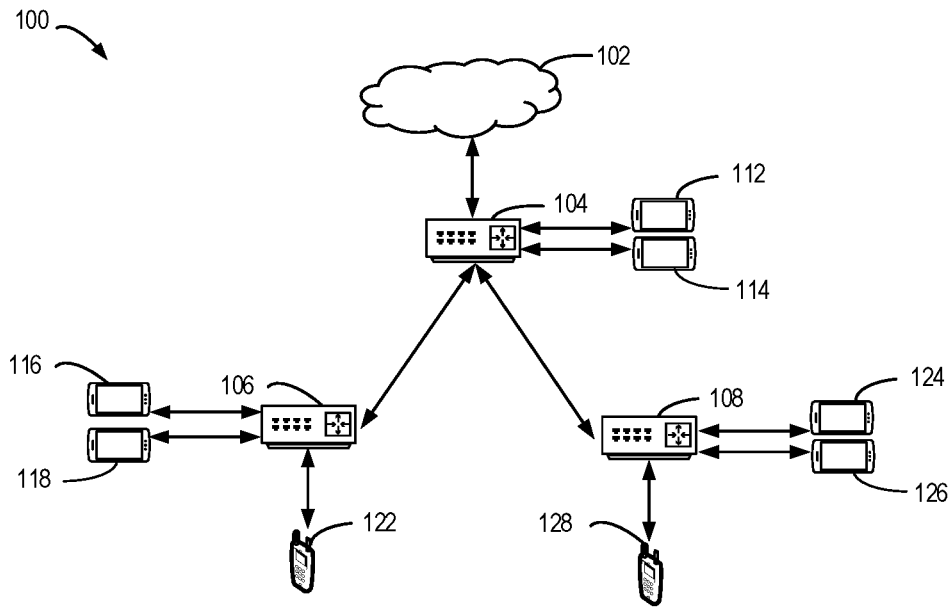
FIG. 1 shows a schematic diagram of an example environment of the wireless distribution system.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as a wireless local area network based on 802.11 protocols, fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" and "second device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a router, a repeater, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows a schematic diagram of an example environment of the wireless distribution system. As shown in FIG. 1, in the WDS 100, a master AP 104 is connected to the Internet 102 and an IPTV server (not shown) through an Ethernet port. The Master AP 104 may establish the WDS links with each of the slave APs 106 and 108 on both 2.4 GHz and 5 GHz channels, with the 5 GHz WDS link selected for the backhaul link. The master AP 104 establishes fronthaul links with the terminal devices 112 and 114 for transmitting two video streams. The slave APs 106 and 108 establishes fronthaul links with the terminal devices 116 to 128 on the 5 GHz WDS link. By way of example, the slave APs 106 and 108 may transmit video streams to the tablets 116, 118, 124 and 126, and provide Internet services to the mobile phones 122 and 128, respectively. With two backhaul links and eight fronthaul links working on the 5G channel at the same time, the mesh network 100 could potentially face serious video freeze problems when playing ultra-high definition (UHD) IPTV videos.

Figure 2:
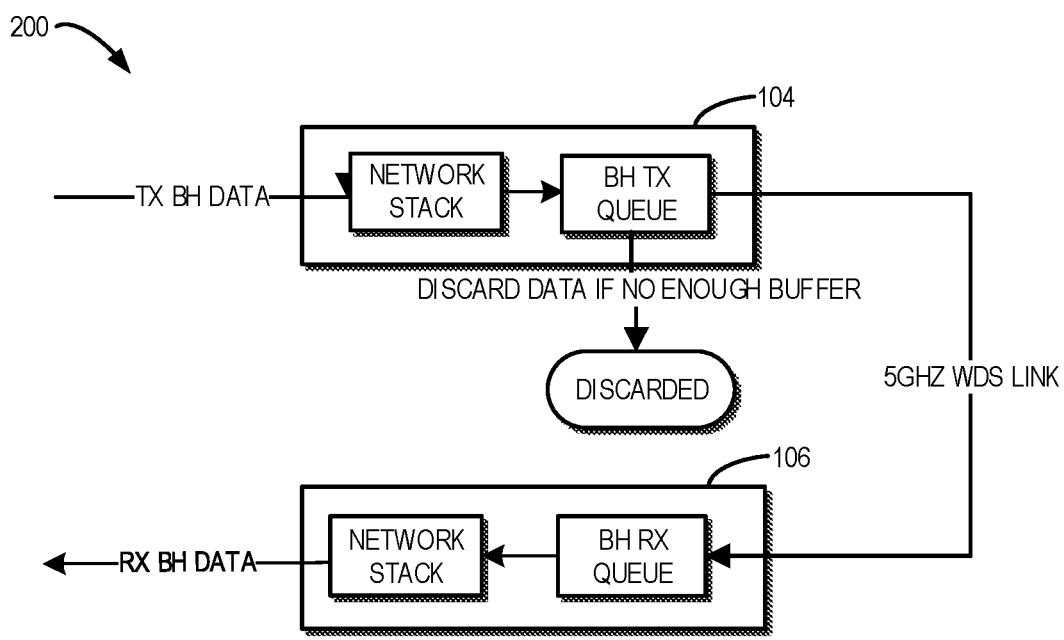
FIG. 2 shows a schematic diagram of the backhaul data discard process between the transmitter (TX) AP and the receiver (RX) AP in the WDS.

FIG. 2 shows a schematic diagram of the backhaul data discard process between the transmitter (TX) AP and the receiver (RX) AP in the WDS. For the purpose of discussion, the process 200 will be described with reference to FIG. 1. The process 200 may involve the transmitter AP 104 and the receiver AP 106, and the 5 GHz WDS link is selected to be the backhaul link. The APs 104 and 106 each includes at least a network stack for registering the wireless interface for transmission/receipt of data packets and a backhaul transmit/receive queue specifically for buffering the backhaul data to be transmitted/received on the 5 GHz WDS link. By way of example, the transmitter AP 104 generates the backhaul data to be transmitted to the receiver AP 106. As shown in FIG. 2, the backhaul data is delivered to the network stack and buffered in the backhaul transmit queue 1. Then, the transmitter AP 104 transmits the backhaul data on the 5 GHz WDS link. From the perspective of the receiver AP 106, upon receiving the backhaul data on the 5 GHz WDS link, the backhaul data is buffered in the backhaul receive queue. Then, the backhaul data is delivered to the applications of the receiver AP 106 through the network stack. However, as described above, due to the bottleneck of a single air interface, in a case where the air interface resources are not enough to transmit the data packet stored in the backhaul transmit queue, some of the data packets will be discarded when the buffer is full.

Figure 3:
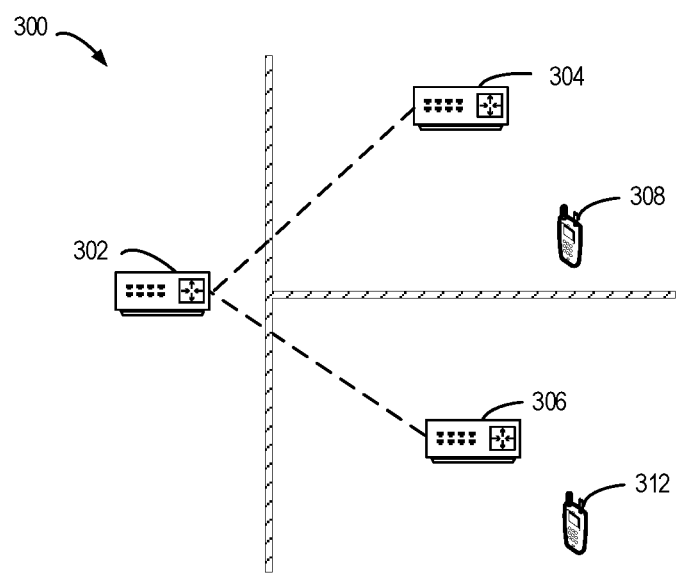
FIG. 3 shows a schematic diagram of another example environment of the wireless distribution system.

FIG. 3 shows a schematic diagram of another example environment of the wireless distribution system. As shown in FIG. 3, the master AP 302 establishes WDS links with the slave APs 304 and 306 on both 2.4 GHz and 5 GHz channels, and the 5 GHz WDS link is selected for the BH. The two terminal devices 308 and 312 each establish a Wi-Fi connection with the slave APs 304 and 306 respectively on the 5 GHz channel, running the speed test tool to monitor the maximum throughput of the network 300. While for the 802.11ac 80M 2*2 AP, the theoretical maximum throughput is about 600M, it is found in the actual test the actual maximum TP is only 200M+. This is because the backhaul and fronthaul of the network work on the same channel, i.e., the 5 GHz channel, and the competition between the backhaul and fronthaul causes each of them to occupy less than 50% of the air interface resources.

In order to solve the insufficiency of air interface resources for the backhaul of multiple AP nodes, the embodiments of the present application provide a solution for implementing dual-channel backhaul in the mesh network. In the dual-channel backhaul architecture, by relying on the WDS links established on both 2.4 GHz and 5 GHz channels, the APs are capable of transmitting data packets for backhaul on both channels in parallel, and air interface resources of the two radios can be fully utilized. Thus, the throughput of the entire mesh network can be improved without resulting in the network loopback problems and the system is more stable.

Figure 4:
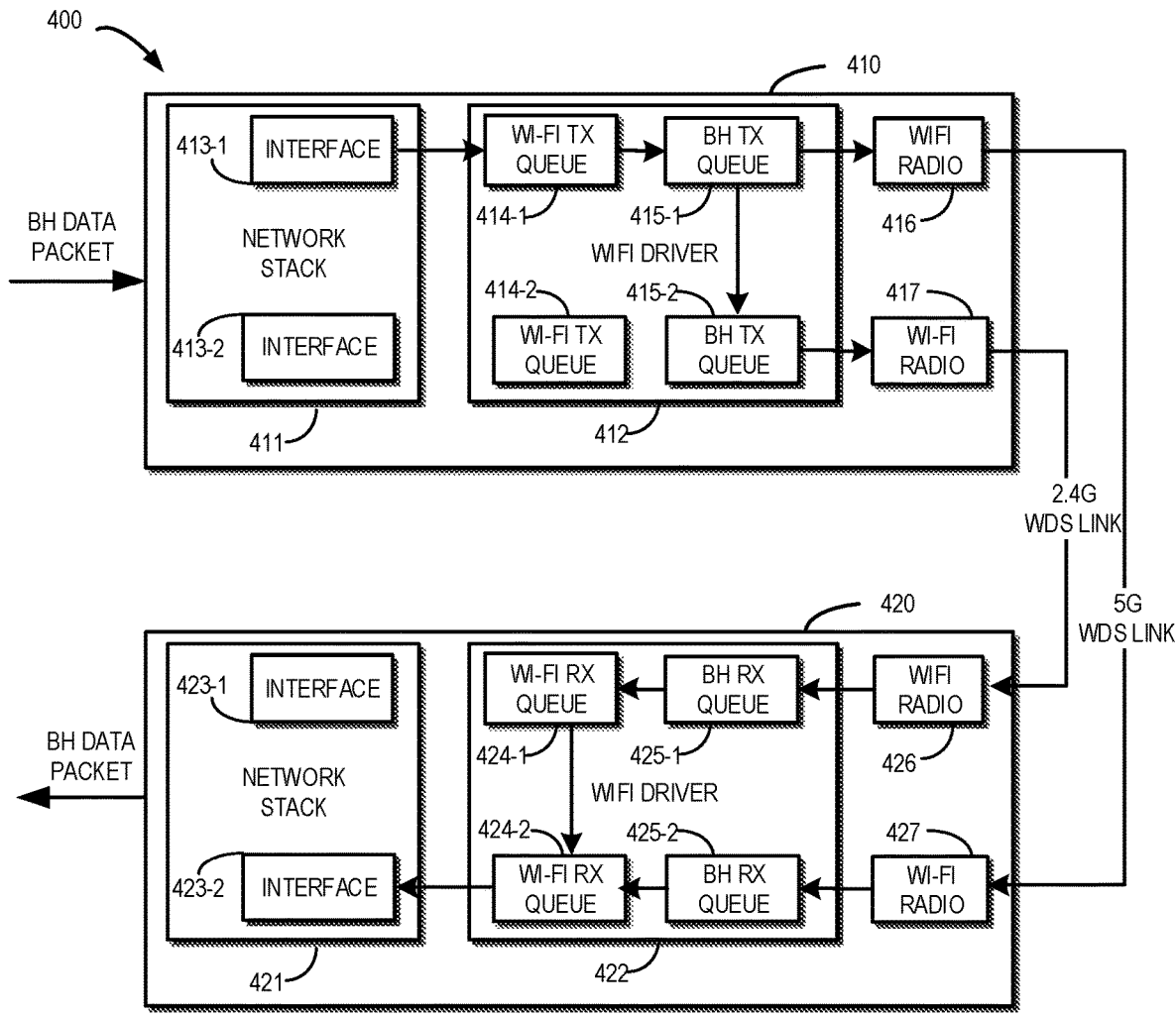
FIG. 4 shows a schematic diagram of a communication environment in which some embodiments of the present disclosure can be implemented.

FIG. 4 shows a schematic diagram of a communication environment in which some embodiments of the present disclosure can be implemented. As shown in FIG. 1, the communication network 400 may be a wireless mesh network and include a first device 410 acting as the transmitter device, and the second device 420 acting as the receiver device. It should be understood that the communication network 400 may further include one or more terminals device and network devices (not shown). The first device 410 and the second device 420 may be dual-channel AP nodes in the WDS, for example, the master and slave APs. The first device 410 and the second device 420 may communicate with each other via two backhaul links, i.e., the 2.4 GHz WDS link and the 5 GHz WDS link. It is to be understood that the number of devices in FIG. 4 is given for the purpose of illustration without suggesting any limitations to the present disclosure. The communication network 400 may include any suitable number of network devices and/or terminal devices adapted for implementing implementations of the present disclosure.

As shown in FIG. 4, the first device 410 includes at least a network stack 411 that is also referred to as the Linux network stack layer, the Wi-Fi driver 412 as well as the Wi-Fi radio modules 416 and 417. Similarly, the second device 420 includes at least a network stack 421 that is also referred to as the Linux network stack layer, the Wi-Fi driver 422 as well as the Wi-Fi radio modules 426 and 427. The first device 410 and the second device 420 may further include a peripheral component interface express (PCIE) driver (not shown).

The wireless interfaces 413-1 and 413-2 are registered with the network stack 411 of the first device 410 for transmitting and receiving data packets. The Wi-Fi driver 412 that is also referred to as the Wi-Fi driver layer includes a Wi-Fi transmit queue 414-1 on 5G and a Wi-Fi transmit queue 414-2 on 2.4G (also collectively referred to as "Wi-Fi TX queue 414") and a backhaul transmit queue 415-1 on 5G and a backhaul transmit queue 415-2 on 5G (also collectively referred to as "backhaul TX queue 415")for storing the backhaul data packets. The logical communication between the Wi-Fi host (not shown) and the Wi-Fi radio modules 416 and 417 is performed through the Wi-Fi TX queue 414. The Wi-Fi chipset may communicate with the AP via the PCIE interface and registers a slot on the PCIE driver. Through the registered slot, the data packets are transmitted between the Wi-Fi host and the Wi-Fi radio modules 416 and 417. The Wi-Fi radio modules 416 and 417 include the Wi-Fi firmware (not shown) for implementing data modulation and demodulation. The Wi-Fi radio modules 416 and 417 may transmit the data packets to a corresponding channel through the radio frequency module on the radio modules 416 and 417, and receives data from the same channel.

Similar to the above configurations of the first device 410, the wireless interfaces 423-1 and 423-2 are registered with the network stack 421 of the second device 420 for transmitting and receiving data packets. The Wi-Fi driver 422 includes a Wi-Fi receive queue 424-1 on 5G and a Wi-Fi receive queue 424-2 on 2.4G (also collectively referred to as "Wi-Fi RX queue 424") and a backhaul receive queue 425-1 on 2.4G and a backhaul receive queue 425-2 on 5G (also collectively referred to as "backhaul RX queue 425") for storing the backhaul data packets. The logical communication between the Wi-Fi host (not shown) and the Wi-Fi radio modules 426 and 427 is performed through the Wi-Fi RX queue 424. The Wi-Fi chipset may communicate with the AP via the PCIE interface and registers a slot on the PCIE driver. Through the registered slot, the data packets are transmitted between the Wi-Fi host and the Wi-Fi radio modules 426 and 427. The Wi-Fi radio modules 426 and 427 include the Wi-Fi firmware (not shown) for implementing data modulation and demodulation. The Wi-Fi radio modules 426 and 427 may transmit the data packets to a corresponding channel through the radio frequency module on the radio modules 426 and 427, and receives data from the same channel.

It is to be understood that the first device 410 and the second device 420 may also be capable of receiving and transmitting data packets on the WDS links. As such, the first device 410 may also include Wi-Fi receive queues (not shown) for storing data packets received on the two WDS links respectively, and backhaul receive queues (not shown) for storing backhaul data packets filtered from the data packets stored in Wi-Fi receive queues. Similarly, the second device 420 may also include Wi-Fi transmit queues (not shown) for storing data packets to be transmitted on the two WDS links respectively, and backhaul transmit queues (not shown) for storing backhaul data packets filtered from the data packets stored in Wi-Fi transmit queues. The present disclosure is not limited in this aspect.

It is also to be understood that the number of network devices, terminal devices and serving cells shown in FIG. 4 is given for the purpose of illustration without suggesting any limitations.

Figure 5:
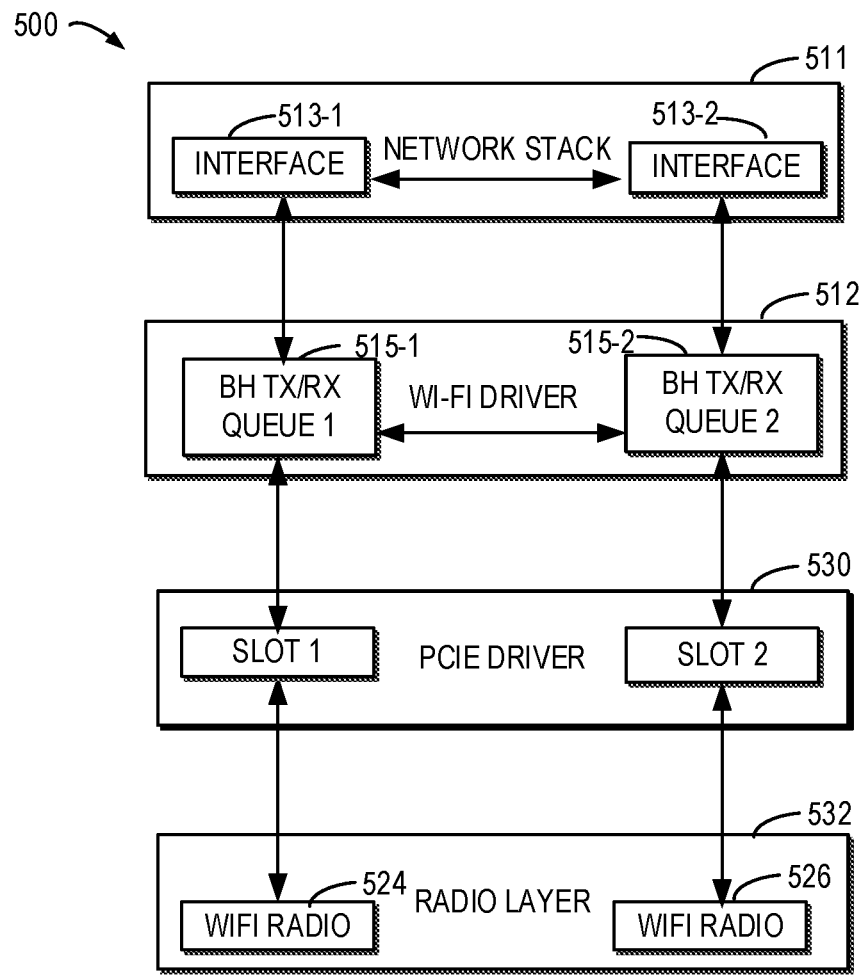
FIG. 5 shows a schematic diagram of the dual-channel backhaul architecture of a device that is suitable for implementing example embodiments of the present disclosure.

FIG. 5 shows a schematic diagram of the dual-channel backhaul architecture of a device that is suitable for implementing example embodiments of the present disclosure. The device 500 can be considered as an example embodiment of the first device 410 and the second device 420 as shown in FIG. 4. Accordingly, the device 500 can be implemented at or as at least a part of the first device 410 and the second device 420.

As shown in FIG. 5, the device 500 may be configured with four layers, namely, the Linux network stack layer 511, the Wi-Fi driver layer 512, the PCIE driver layer 530 and the radio layer 532. The device 500 is capable of operating at dual-band, with wireless interfaces 513-1 and 513-2 registered in the network stack 511. The wireless interfaces 513-1 and 513-2 are used to connect the network stack 511 to the Wi-Fi driver 512. The Wi-Fi driver layer 512 includes the backhaul transmit/receive queue 515-1 and 515-2 corresponding to the first backhaul link (e.g., the 5 GHz WDS link) and the second backhaul link (e.g., the 2.4 GHz WDS link). Slots 1 and 2 are registered with the PCIE driver layer 530 corresponding to the first and second backhaul links. The Wi-Fi radio layer 532 includes the Wi-Fi radio modules 416 and 417 respectively for transmitting and receiving data packets on the first and second backhaul links.

In some embodiments, the device 500 may establish WDS links with both the 5 GHz radio and the 2.4 GHz radio, and activate the 5 GHz WDS link and the 2.4 GHz WDS link for backhaul. In this architecture, at least part of the backhaul data is bypassed to the backhaul transmit/receive queue 515-1 from the backhaul transmit/receive queue 515-2, and thus the data packets are to be transmitted on both the first backhaul link (e.g., the 5 GHz WDS link) and the second backhaul link (e.g., the 2.4 GHz WDS link).

Figure 6:
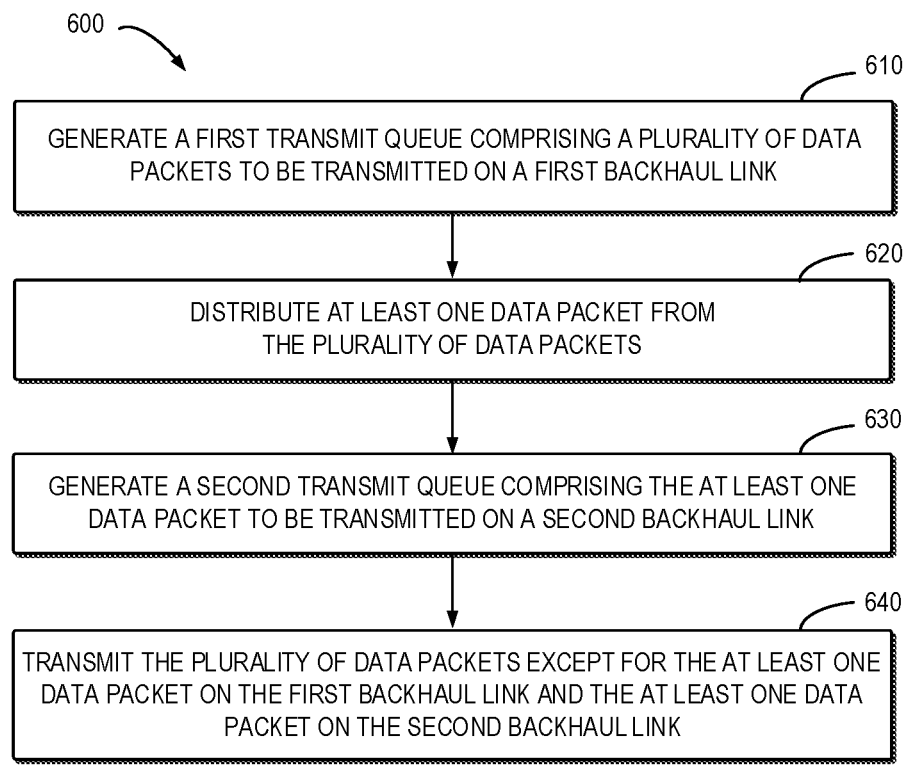
FIG. 6 shows a flowchart of an example method of dual channel backhaul according to some example embodiments of the present disclosure.

Principle and implementations of the present disclosure will be described in detail below with reference to FIGS. 6 to 9. FIG. 6 shows a flowchart of an example method of dual channel backhaul according to some example embodiments of the present disclosure. In some embodiments, the method 600 can be implemented at an access point device, such as the first device 410 as shown in FIG. 4. Additionally, or alternatively, the method 600 can also be implemented at other AP nodes not shown in FIG. 4. For the purpose of discussion, the method 600 will be described with reference to FIG. 4 as performed by the first device 410 without loss of generality.

At 610, the first device 410 generates the first transmit queue comprising a plurality of data packets to be transmitted to the second device 420 on a first backhaul link. In some embodiments, the first device 410 may establish both the 2.4 GHz and 5 GHz WDS links with the second device 420. By way of example, the 5 GHz WDS link is selected for backhaul initially. Upon obtaining the backhaul data packets to be transmitted to the second device 420, the first device 410 may deliver the data packets into the network stack. Through the wireless interface corresponding to the 5 GHz WDS link, the backhaul data packets are stored in the Wi-Fi transmit queue, and then filtered and buffered in the first backhaul transmit queue specific to the 5 GHz WDS link.

In some embodiments, the first device 410 may configure the plurality of the data packets with a transmitter address and a receiver address associated with the first backhaul link in generating the first backhaul transmit queue. In some other embodiments, the first device 410 may further configure indices of the plurality of the data packets for numbering purpose.

For example, the first device 410 may configure a sequence number of a MAC header of the plurality of the data packets. By configuring the 802.11 MAC header sequence number of the backhaul data, the backhaul data packets to be transmitted on 2.4 GHz WDS link and 5 GHz WDS link may be identified and numbered. Alternatively, the quality of service (QoS) control filed of the 802.11 MAC header includes 8-15 unused bits. In this case, the first device 420 may configure at least one bit in the QoS filed of the MAC header for numbering the backhaul data. For yet another example, an index field for numbering backhaul data may be added to the data section header of the backhaul data packets. FIG. 7 shows a schematic diagram of data numbering field in MAC header of the data according to some example embodiments of the present disclosure.

In a case where air interface resources of the current backhaul link have been run out, the first device 410 and/or the first backhaul transmit queue of the first device 410 cannot buffer more data packets, the first device 410 may bypass the excessive data packets into another channel, i.e., the second backhaul link. To this end, the first device 410 may utilize a distribution strategy to determine whether to distribute the backhaul data packets from the first backhaul transmit queue to the second backhaul transmit queue.

In some embodiments, the first device 410 may determine the amount of the plurality of data packets in the first backhaul transmit queue and compare the amount with a predetermined threshold value. If the amount of the backhaul data packets in the first backhaul transmit queue exceeds the predetermined threshold value, the first device 410 may determine that the distribute strategy is met.

In some other embodiments, the first device 410 may determine the depth of the first backhaul transmit queue and compare the depth with a predetermined threshold depth. If the depth of the first backhaul transmit queue exceeds the predetermined threshold depth, the first device 410 may determine that the distribute strategy is met.

If the distribution strategy is met, the first device 410, at 620, selects at least one data packet from the plurality of data packets. Without bypassing the at least one data packet from the first backhaul transmit queue to the second backhaul transmit queue, these data packets should have been discarded due to memory overflow.

At 630, the first device 410 generates the second backhaul transmit queue comprising the at least one data packet. The second transmit queue is to be transmitted to the second device 420 on the second backhaul link (e.g., 2.4 GHz WDS link) different from the first backhaul link (e.g., 5 GHz WDS link).

As each Wi-Fi radio of the first device 410 corresponds to a unique MAC address, in a case where at least part of the backhaul data packets in the first backhaul transmit queue are distributed to the second backhaul transmit queue, the transmitter address and the receiver address of the part of the backhaul data packets needs to be replaced with the MAC addresses corresponding to the second backhaul link. The first device 410 may convert the transmission transmitter address and the receiver address configured with the at least one data packet from the transmission transmitter address and the receiver address associated with the first backhaul link to the transmission transmitter address and the receiver address associated with the first backhaul link.

At 640, the first device 410 transmits, to the second device 420, the plurality of data packets except for the at least one data packet on the first backhaul link and the at least one data packet on the second backhaul link. In some embodiments, the first device 410 and the second device 420 may transmit and receive the backhaul data packets based on a sliding window mechanism. For example, by setting the sliding window, the receive device 420 may report all the previously received backhaul data packets and move the sliding window after receiving the last data packet allowed by the sliding window. Additionally, or alternatively, the first device 410 and the second device 420 may transmit and receive the backhaul data packets based on a timeout mechanism. In this case, after receiving the backhaul data packets within the sliding window, the second device 420 may refresh the waiting time. Once the timeout is triggered, and no more data packets are received, all the previously received data packets will be uploaded and the sliding window will be moved forward FIG. 8 shows a flowchart of an example method of dual channel backhaul according to some example embodiments of the present disclosure. In some embodiments, the method 800 can be implemented at an access point device, such as the second device 420 as shown in FIG. 4. Additionally, or alternatively, the method 800 can also be implemented at other AP nodes not shown in FIG. 4. For the purpose of discussion, the method 800 will be described with reference to FIG. 4 as performed by the first device 410 without loss of generality.

At 810, the second device 420 receives the plurality of data packets transmitted, by the first device 410, on both the first backhaul link and the second backhaul link. The first backhaul link is established at the first radio frequency (e.g., 5 GHz), and the second backhaul link is established at the second radio frequency different from the first radio frequency, such as 2.4 GHz.

At 820, the second device 420 generates the first receive queue including at least one of the plurality of the data packet received on the first backhaul link. At 830, the second device 420 generates the second receive queue including the plurality of data packets except for the at least one data packet received on the second backhaul link.

In some embodiments, the second device 420 may store the data packets received on the first backhaul link in the Wi-Fi receive queue corresponding to the first backhaul link, and the data packets received on the second backhaul link in the Wi-Fi receive queue corresponding to the second backhaul link. After filtering, the data packets may then be buffered in the backhaul receive queue specific to the first backhaul link and the backhaul receive queue specific to the second backhaul link.

At 840, the second device 420 aggregates the data packets in the second receive queue into the first receive queue. In some embodiments, the second device 420 may transfer the data packets in the second receive queue into the first receive queue in a manner of shared memory. In aggregating the data packets in the first backhaul receive queue, the second device 420 may sort the data packets based on the indices of the plurality of the data packets.

In some embodiments, the second device 420 may deliver the aggregated data packets to the network stack via the wireless interface corresponding to the first backhaul link and then to an application of the second device 420.

By such a dual-channel backhaul architecture, the channel resources on the two channels can be fully utilized for backhaul. With the distribution strategy and the numbering scheme, the solution proposed in the present disclosure bypasses part of the data packets from one backhaul link to another one before the air interface resources on the one backhaul link is run out, without discarding the backhaul data. As such, the throughput of the entire mesh network can be significantly improved and the system is more stable.

Figure 9:
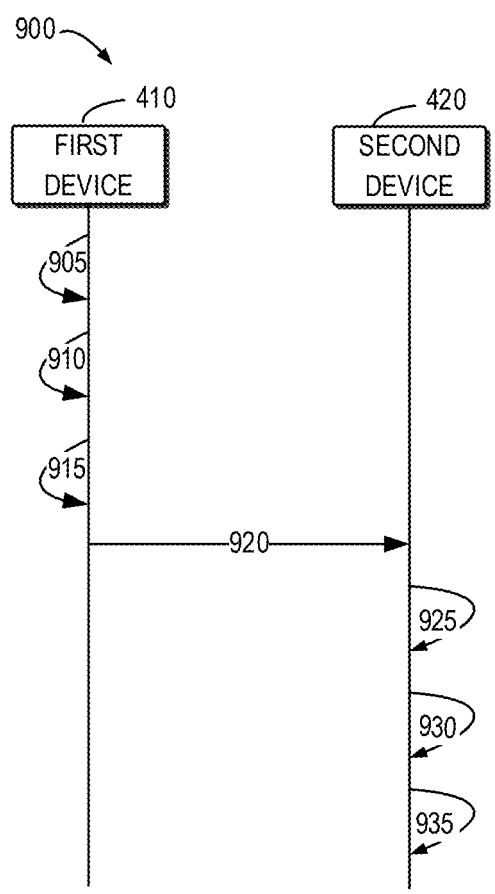
FIG. 9 illustrates an example signaling chart showing an example process for dual-channel backhaul in accordance with some embodiments of the present disclosure.

FIG. 9 illustrates an example signaling chart showing an example process for dual-channel backhaul in accordance with some embodiments of the present disclosure. For the purpose of discussion, the process 800 will be described with reference to FIGS. 4 and 5. The process 900 may involve the first device 410 and the second device 420.

At 905, the first device 410 generates a first transmit queue. The first transmit queue may include a plurality of data packets to be transmitted to the second device 420. At 910, if the first device 410 determines that the distribution strategy is met, the first device 410 selects at least one data packet from the plurality of data packets. At 915, the first device 410 generates the second transmit queue. The second transmit queue includes the at least one data packet selected at 610. At 920, the first device 410 transmits, to the second device 420, the plurality of data packets except for the at least one data packet on the first backhaul link and the at least one data packet on the second backhaul link. The first backhaul link is established at a first radio frequency (e.g., 5 GHz) and the second backhaul link is established at a second radio frequency (e.g., 2.4 GHz). The second device 420 receives the plurality of data packets transmitted by the first device 410 on both the first backhaul link and the second backhaul link. At 925, the second device 420 generates the first receive queue. The first receive queue includes at least one of the plurality of the data packet received on the first backhaul link. At 930, the second device 420 generates the second receive queue. The second receive queue includes the plurality of data packets except for the at least one data packet received on the second backhaul link. At 835, the second device 420 aggregates the data packets in the second receive queue into the first receive queue.

In some example embodiments, an apparatus capable of performing the method 600 (for example, the first device 410) may comprise means for performing the respective steps of the method 600. The means may be implemented in any suitable form. For example, the means may be implemented in a circuitry or software module. The apparatus may be implemented as or included in the first device 410. In some embodiments, the means may comprise at least one processor and at least one memory including computer program code. The at least one memory and computer program code are configured to, with the at least one processor, cause performance of the apparatus.

In some example embodiments, the apparatus comprises means for generating a first transmit queue comprising a plurality of data packets to be transmitted to a second device on a first backhaul link; means for in accordance with a determination that a distribution strategy is met, selecting at least one data packet from the plurality of data packets; means for generating a second transmit queue comprising the at least one data packet, the second transmit queue to be transmitted to the second device on a second backhaul link different from the first backhaul link; and means for transmitting, to the second device, the plurality of data packets except for the at least one data packet on the first backhaul link and the at least one data packet on the second backhaul link.

In some example embodiments, the means for generating the first transmit queue comprises: means for configuring the plurality of the data packets with a transmitter address and a receiver address associated with the first backhaul link; and means for configuring indices of the plurality of the data packets.

In some example embodiments, the means for configuring the indices of the plurality of the data packets comprises one of: means for configuring a sequence number of a MAC header of the plurality of the data packets; means for configuring at least one bit in a quality of service filed of the MAC header of the plurality of the data packets; and means for adding an index field in the plurality of the data packets.

In some example embodiments, the means for generating the second transmit queue comprises: means for converting a transmitter address and a receiver address configured with the at least one data packet from a transmitter address and a receiver address associated with the first backhaul link to a transmitter address and a receiver address associated with the first backhaul link.

In some example embodiments, the apparatus further comprises means for determining an amount of the plurality of data packets in the first transmit queue; and means for in accordance with a determination that the amount of the plurality of the data packets in the first transmit queue exceeds a predetermined threshold value, determining the distribute strategy is met.

In some example embodiments, the apparatus further comprises means for determining a depth of the first transmit queue; and means for in accordance with a determination that the depth of the first transmit queue exceeds a predetermined threshold depth, determining the distribute strategy is met.

In some example embodiments, the apparatus further comprises means for establishing the first backhaul link with the second device at a first radio frequency; means for establishing the second backhaul link with the second device at a second radio frequency different from the first radio frequency; and means for configuring the first backhaul link to be active and the second backhaul link to be standby.

In some example embodiments the first device and the second device both are access point devices of a wireless distribution system.

In some example embodiments, an apparatus capable of performing the method 800 (for example, the second device 420) may comprise means for performing the respective steps of the method 800. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus. The apparatus may be implemented as or included in the second device 420.

In some example embodiments, the apparatus comprises means for receiving a plurality of data packets transmitted, by a first device, on both a first backhaul link and a second backhaul link, the first backhaul link being established at a first radio frequency, the second backhaul link being established at a second radio frequency different from the first radio frequency; means for generating a first receive queue including at least one of the plurality of the data packet received on the first backhaul link; means for generating a second receive queue including the plurality of data packets except for the at least one data packet received on the second backhaul link; and means for aggregating the data packets in the second receive queue into the first receive queue.

In some example embodiments, the apparatus further comprises means for establishing the first backhaul link with the first device at a first radio frequency; means for establishing the second backhaul link with the first device at a second radio frequency different from the first radio frequency; and means for configuring the first backhaul link to be active and the second backhaul link to be standby.

In some example embodiments, the apparatus further comprises means for transmitting the aggregated data packets to an application of the second device.

In some example embodiments, the means for aggregating the data packets in the second receive queue into the first receive queue comprises: means for sorting the data packets in the first receive queue and the second receive queue based on indices of the plurality of the data packets; and means for storing the sorted plurality of the data packets in the first receive queue.

In some example embodiments, indices of the plurality of the data packets are indicated by one of the following: a sequence number of a MAC header of the plurality of the data packets; at least one bit in a quality of service filed of the MAC header of the plurality of the data packets; and an index field in the plurality of the data packets.

In some example embodiments, the first device and the second device both are access point devices of a wireless distribution system.

The embodiments of the present disclosure provide a computer program comprising instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

The embodiments of the present disclosure provide a computer program comprising instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

The embodiments of the present disclosure provide a computer readable medium comprising program instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

The embodiments of the present disclosure provide a computer readable medium comprising program instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

The embodiments of the present disclosure provide a non-transitory computer readable medium comprising program instructions for causing an apparatus to perform at least the following: generating a first transmit queue comprising a plurality of data packets to be transmitted to a second device on a first backhaul link; in accordance with a determination that a distribution strategy is met, distributing at least one data packet from the plurality of data packets; generating a second transmit queue comprising the at least one data packet, the second transmit queue to be transmitted to the second device on a second backhaul link different from the first backhaul link; and transmitting, to the second device, the plurality of data packets except for the at least one data packet on the first backhaul link and the at least one data packet on the second backhaul link.

The embodiments of the present disclosure provide a non-transitory computer readable medium comprising program instructions for causing an apparatus to perform at least the following: receiving a plurality of data packets transmitted, by a first device, on both a first backhaul link and a second backhaul link, the first backhaul link being established at a first radio frequency, the second backhaul link being established at a second radio frequency different from the first radio frequency; generating a first receive queue including at least one of the plurality of the data packet received on the first backhaul link; generating a second receive queue including the plurality of data packets except for the at least one data packet received on the second backhaul link; and aggregating the data packets in the second receive queue into the first receive queue.

Figure 10:
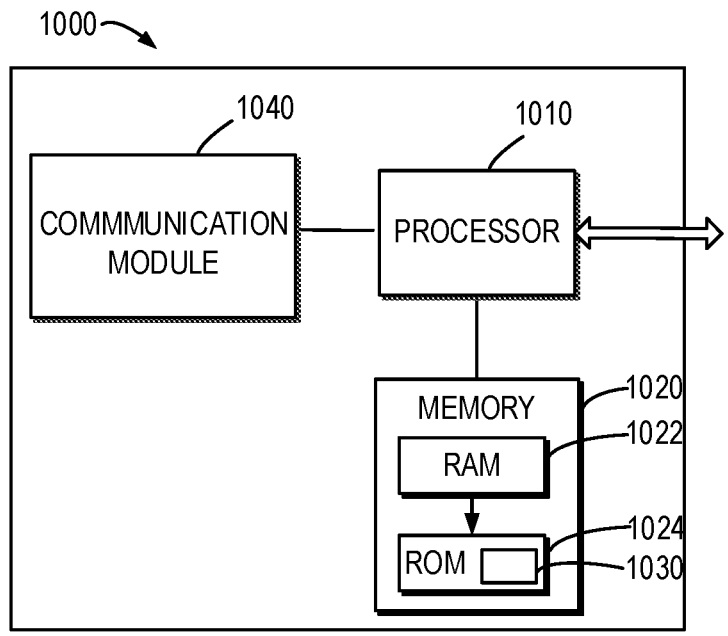
FIG. 10 shows a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement the communication device, for example the first device 410 and the second device 420 as shown in FIG. 4. As shown, the device 1000 includes one or more processors 1010, one or more memories 1040 coupled to the processor 1010, and one or more transmitters and/or receivers (TX/RX) 1040 coupled to the processor 1010.

The TX/RX 1040 is for bidirectional communications. The TX/RX 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 6 and 8. The embodiments of the present disclosure may also be implemented by hardware or by a combination of software and hardware.

Figure 11:
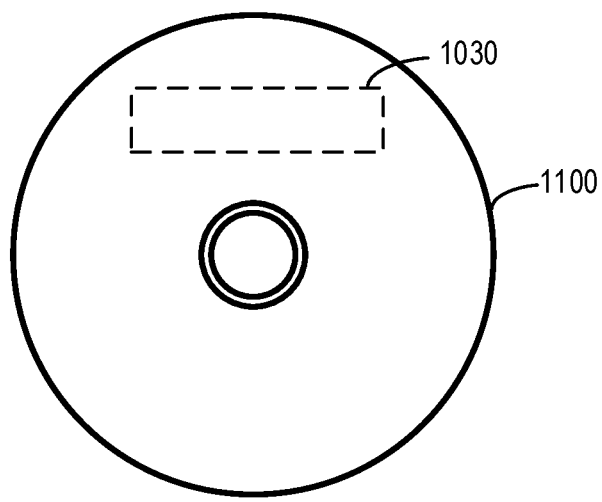
FIG. 11 shows a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 600 and 800 as described above with reference to FIGS. 6 and 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:
1. A first device comprising:
   at least one processor; and
   at least one memory including computer program codes;
   the at least one memory and the computer program codes are configured to, with the at least one processor, cause the first device to:

generate a first transmit queue comprising a plurality of data packets to be transmitted to a second device on a first backhaul link;
in accordance with a determination that a distribution strategy is met, select at least one data packet from the plurality of data packets;
generate a second transmit queue comprising the at least one data packet, the second transmit queue to be transmitted to the second device on a second backhaul link different from the first backhaul link; and
transmit, to the second device, the plurality of data packets except for the at least one data packet on the first backhaul link and the at least one data packet on the second backhaul link simultaneously,
wherein the first device is caused to generate the first transmit queue by:
configuring the plurality of the data packets with a transmitter address and a receiver address associated with the first backhaul link; and
configuring indices of the plurality of the data packets.

2. The first device of claim 1, wherein the first device is caused to configure the indices of the plurality of the data packets by one of the following:
configuring a sequence number of a MAC header of the plurality of the data packets;
configuring at least one bit in a quality of service filed of the MAC header of the plurality of the data packets; and
adding an index field in the plurality of the data packets.

3. The first device of claim 1, wherein the first device is caused to generate the second transmit queue by:
converting a transmitter address and a receiver address configured with the at least one data packet from a transmitter address and a receiver address associated with the first backhaul link to a transmitter address and a receiver address associated with the first backhaul link.

4. The first device of claim 1, wherein the first device is further caused to do one of:
determine an amount of the plurality of data packets in the first transmit queue;
in accordance with a determination that the amount of the plurality of the data packets in the first transmit queue exceeds a predetermined threshold value, determine the distribute strategy is met; or
determine a depth of the first transmit queue; and
in accordance with a determination that the depth of the first transmit queue exceeds a predetermined threshold depth, determine the distribute strategy is met; or
establish the first backhaul link with the second device at a first radio frequency;
establish the second backhaul link with the second device at a second radio frequency different from the first radio frequency; and
configure the first backhaul link to be active and the second backhaul link to be standby.

5. The first device of claim 1, wherein the first device and the second device both are access point devices of a wireless distribution system.

6. A second device comprising:
at least one processor; and
at least one memory including computer program codes;
the at least one memory and the computer program codes are configured to, with the at least one processor, cause the second device to:
receive a plurality of data packets transmitted, by a first device, on both a first backhaul link and a second backhaul link simultaneously, the first backhaul link being established at a first radio frequency, the second backhaul link being established at a second radio frequency different from the first radio frequency;
generate a first receive queue including at least one of the plurality of the data packet received on the first backhaul link;
generate a second receive queue including the plurality of data packets except for the at least one data packet received on the second backhaul link; and
aggregate the data packets in the second receive queue into the first receive queue;
wherein the second device is caused to aggregate the data packets in the second receive queue into the first receive queue by:
sorting the data packets in the first receive queue and the second receive queue based on indices of the plurality of the data packets; and
storing the sorted plurality of the data packets in the first receive queue.

7. The second device of claim 6 wherein the second device is further caused to:
establish the first backhaul link with the first device at a first radio frequency;
establish the second backhaul link with the first device at a second radio frequency different from the first radio frequency; and
configure the first backhaul link to be active and the second backhaul link to be standby.

8. The second device of claim 6, wherein the second device is further caused to:
transmit the aggregated data packets to an application of the second device.

9. The second device of claim 6, wherein indices of the plurality of the data packets are indicated by one of the following:
a sequence number of a MAC header of the plurality of the data packets;
at least one bit in a quality of service filed of the MAC header of the plurality of the data packets; and
an index field in the plurality of the data packets.

10. The second device of claim 6, wherein the first device and the second device both are access point devices of a wireless distribution system.

11. A method comprising:
generating, at a first device, a first transmit queue comprising a plurality of data packets to be transmitted to a second device on a first backhaul link;
in accordance with a determination that a distribution strategy is met, distributing at least one data packet from the plurality of data packets;
generating a second transmit queue comprising the at least one data packet, the second transmit queue to be transmitted to the second device on a second backhaul link different from the first backhaul link; and
transmitting, to the second device, the plurality of data packets except for the at least one data packet on the first backhaul link and the at least one data packet on the second backhaul link simultaneously;
wherein generating the first transmit queue comprises:
configuring the plurality of the data packets with a transmitter address and a receiver address associated with the first backhaul link; and
configuring indices of the plurality of the data packets.

12. The method of claim 11, wherein configuring the indices of the plurality of the data packets comprises one of the following;
- configuring a sequence number of a MAC header of the plurality of the data packets;
- configuring at least one bit in a quality of service filed of the MAC header of the plurality of the data packets; and
- adding an index field in the plurality of the data packets.

13. The method of claim 11, wherein generating the second transmit queue comprises:
- converting a transmitter address and a receiver address configured with the at least one data packet from a transmitter address and a receiver address associated with the first backhaul link to a transmitter address and a receiver address associated with the first backhaul link.

14. The method of claim 11, further comprises one of:
- determining an amount of the plurality of data packets in the first transmit queue;
- in accordance with a determination that the amount of the plurality of the data packets in the first transmit queue exceeds a predetermined threshold queue depth, determining the distribute strategy is met; or
- determining a depth of the first transmit queue; and
- in accordance with a determination that the depth of the first transmit queue exceeds a predetermined threshold queue depth, determining the distribute strategy is met; or
- establishing the first backhaul link with the second device at a first radio frequency;
- establishing the second backhaul link with the second device at a second radio frequency different from the first radio frequency; and
- configuring the first backhaul link to be active and the second backhaul link to be standby.

15. The method of claim 11, wherein the first device and the second device both are access point devices of a wireless distribution system.

16. A non-transitory computer readable medium comprising program instructions for causing an apparatus to perform at least the method of claim 11.

* * * * *